United States Patent [19]

Jones

[11] 4,335,743

[45] Jun. 22, 1982

[54] MILKING MACHINE SYSTEM, AND PRESSURE REGULATOR INCORPORATED THEREIN

[76] Inventor: Leon Jones, 18192 Gothard St., Huntington Beach, Calif. 92648

[21] Appl. No.: 134,686

[22] Filed: Mar. 27, 1980

[51] Int. Cl.³ .............................................. F16K 31/12
[52] U.S. Cl. ............................... 137/494; 119/14.44; 137/526; 251/331
[58] Field of Search ................. 137/494, 526, DIG. 8, 137/DIG. 9; 251/331; 119/14.44

[56] References Cited

U.S. PATENT DOCUMENTS 3,766,933 10/1973 Nicholson, Jr. .............. 137/DIG. 8
3,811,467 5/1974 Jones .................................. 137/494

*Primary Examiner*—William R. Cline
*Attorney, Agent, or Firm*—Gausewitz, Carr, Rothenberg & Edwards

[57] ABSTRACT

A vacuum pump is connected through a vacuum line to the milking apparatus, and a pressure regulator is employed to admit into the line the amount of ambient air necessary to maintain line pressure constant within narrow limits. The pressure regulator comprises a rolling-sleeve air valve to control the admission of ambient air, and which is itself controlled by a bias spring and an opposed diaphragm. One side of the diaphragm is subjected to pressure generally equal to line pressure, whereas the other side is subjected to the pressure of air within a dome. Means are provided to admit into the dome sufficient air to maintain dome pressure constant. Means are also provided to bleed air through the diaphragm, thus maintaining substantially constant the pressure drop thereacross. The air valve is constructed with a deflecting skirt which prevents false sensing of line pressure.

11 Claims, 4 Drawing Figures

MILKING MACHINE SYSTEM, AND PRESSURE REGULATOR INCORPORATED THEREIN

DESCRIPTION OF THE PRIOR ART

The apparatus described in my prior U.S. Pat. Nos. 3,811,467 and 3,938,547 incorporated an air valve which could not be injection molded of synthetic resin in a practical and economical manner. Very close tolerances were required in the air valve, since a slight increase in the diameter of the moving element would cause sticking whereas a slight decrease in such diameter would cause excessive leakage of air. Even when the tolerance was precisely as desired, there was continuous leakage of air through the air valve. This was not a major problem with large systems incorporating high-capacity vacuum pumps, but in some small systems it prevented successful operation of the unit.

The pressure regulator described in such patents was characterized by a very fast response time and a short stroke. This was thought to be important for first-class commercial operation. Applicant has now discovered that a much longer response time and longer stroke are commercially highly satisfactory, resulting in excellent control of line pressure.

SUMMARY OF THE INVENTION

Leakage in the main air valve of the pressure regulator is prevented by means of a rolling sleeve which is fully satisfactory when used even with inexpensive injection-molded synthetic-resin valve parts. Because of the rolling action, there is no worry about shear after the parts become gritty or sticky due to long use. The rolling-sleeve valve has a relatively long stroke and response time. Yet, surprisingly, the pressure regulation is extremely good.

By virtue of the present invention, it becomes more practical to employ in small milking systems (for example, for only four or six cows) the sophisticated principles described in the cited patent. Because there is no leakage, energy is saved and low-capacity vacuum pumps are fully satisfactory.

In accordance with one aspect of the invention, a simple and economical sensing means for line pressure is associated with the regulator at a point very close to the ports for in-flowing air, yet the sensing is not disturbed by such air.

DETAILED DESCRIPTION OF THE PREFERRED EMBODIMENT

Throughout this specification and claims, to minimize confusion, reference is normally made to "pressure" instead of "vacuum", even though the "pressure" is less than atmospheric. Thus, the pressures referred to in the specification are absolute pressures as distinguished from gauge pressures, namely psia as distinguished from psig.

Figure 1:
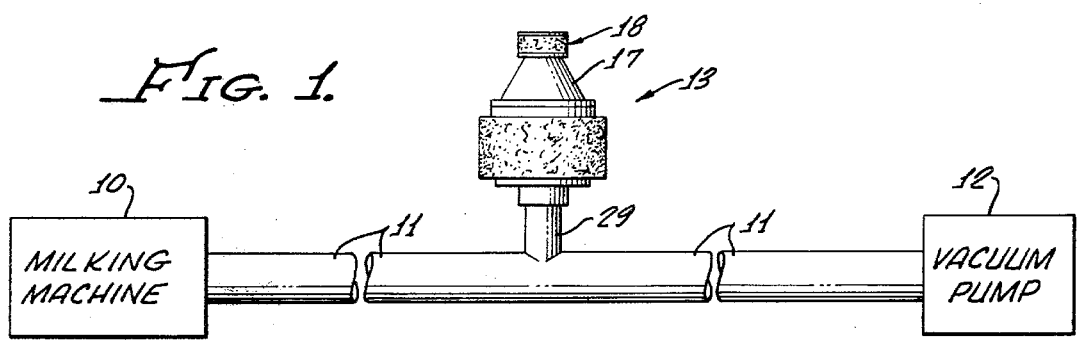
FIG. 1 is an elevational view of the present milking machine system, the milking machine and vacuum pump being shown schematically.

Referring first to FIG. 1, a cow milking machine system is illustrated to comprise a milking machine 10 which is connected by a vacuum line 11 to a vacuum pump 12. The milking machine may incorporate various sets of teat cups as well as milk traps, valves, etc.

Vacuum pump 12 is so operated that it will always attempt to draw on line 11 a greater vacuum than that which is desired to be present in the line. Therefore, to control the line pressure, ambient air is introduced into the line in the proper amount to cause the line pressure to be at a fixed value which is regulated within narrow limits by the present invention. This value is, because of the introduction of ambient air, higher than that which the vacuum pump 12 is attempting to achieve. The ambient air is introduced by a pressure (and vacuum) regulator 13 which is described in detail below.

Pressure regulator 13 comprises a cup-shaped body 14 over which is secured, by screws 15, a dome 17. The dome has incorporated in the upper portion thereof an air-inlet and pressure-controlling valve 18. A diaphragm 20 is mounted across the lower end of the dome, having its edge portion sealingly mounted between dome 17 and the rim of body 14. Diaphragm 20 has a thin steel plate incorporated therein and therefore is rigid except at its peripheral regions. The dome 17 and diaphragm 20 define between them a "dome chamber" 22.

An air valve 24 is mounted below body 14, and comprises a cylindrical body 25 having a diameter substantially less than that of body 14. Screwed into the upper end of body 25 is a ring 27. The upper end of the ring supports three equally-spaced (circumferentially) foot or lug portions 28 which are integral with the underside of body 14. Suitable screws, not shown, extend vertically through foot portions 28 and are threaded into ring 27 to maintain the parts in assembled condition.

The lower end of air-valve body 25 connects coaxially to a pipe 29 arranged in Tee relationship to vacuum line 11 of the milking system.

Figure 4:
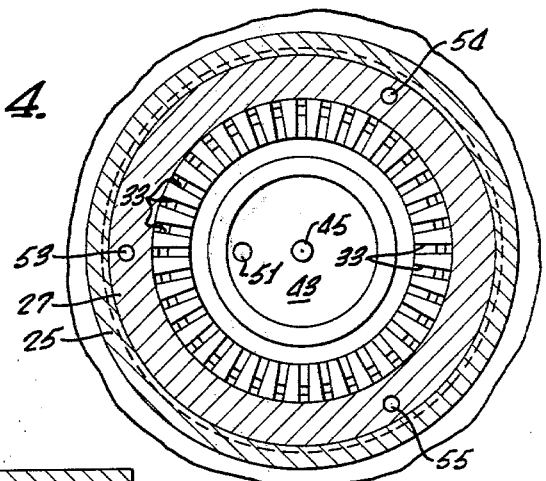
FIG. 4 is a horizontal sectional view on line 4—4 of FIG. 3, showing the notches through which air flows into the line.

Inserted downwardly into ring 27 is a seal tube 31, having an outwardly-extending radial flange at its upper end. Such flange seats on a shoulder formed internally of the ring 27, at a substantial distance below the upper end of the ring. As best shown in FIG. 4, the flange and the adjacent portions of the cylindrical body of seal tube 31 are provided with a large number of notches 33 having teeth therebetween.

Figure 2:
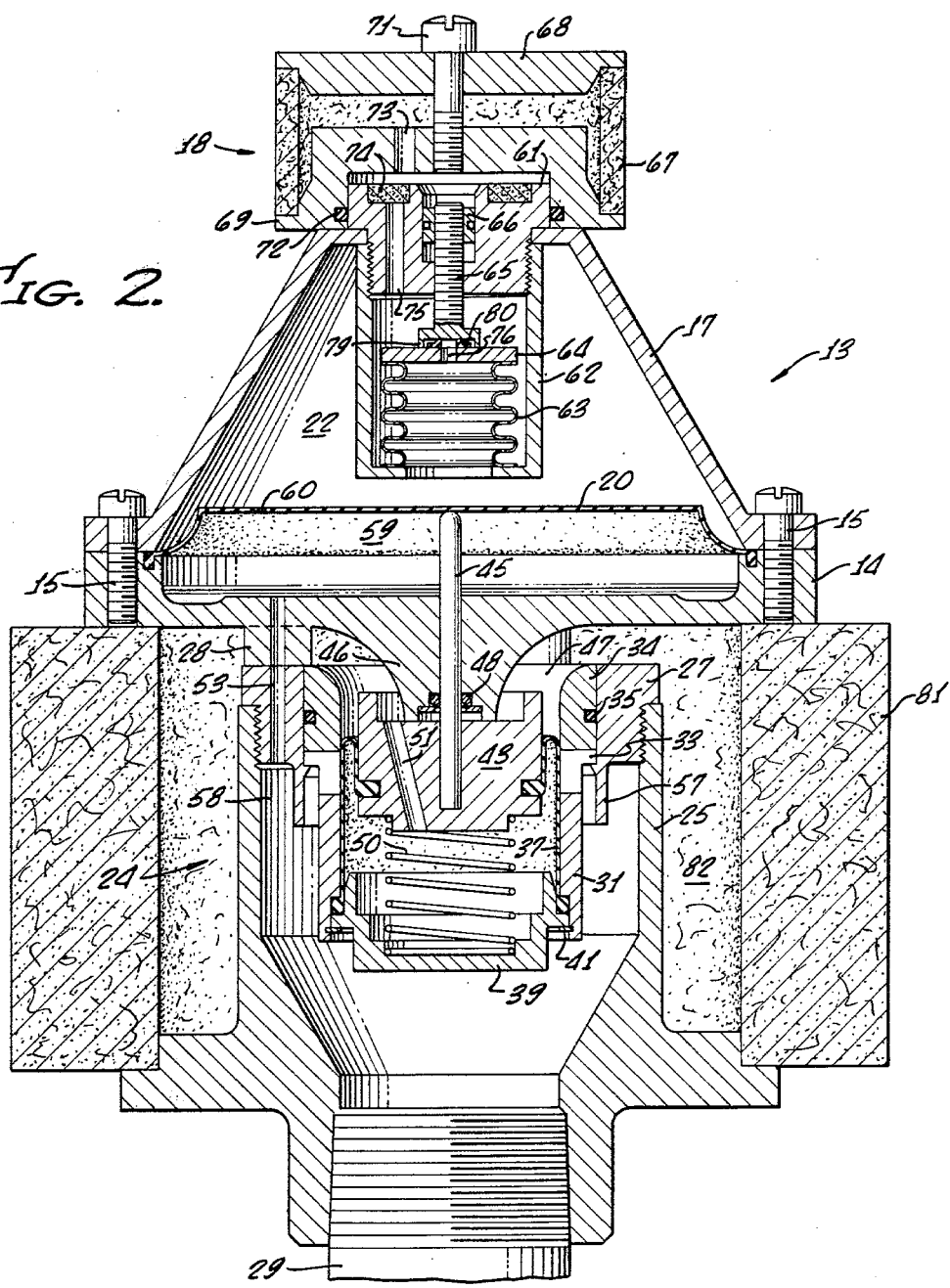
FIG. 2 is an enlarged vertical sectional view of the pressure-regulating portion of the system, the main air valve in the regulator being shown in closed condition.
Figure 3:
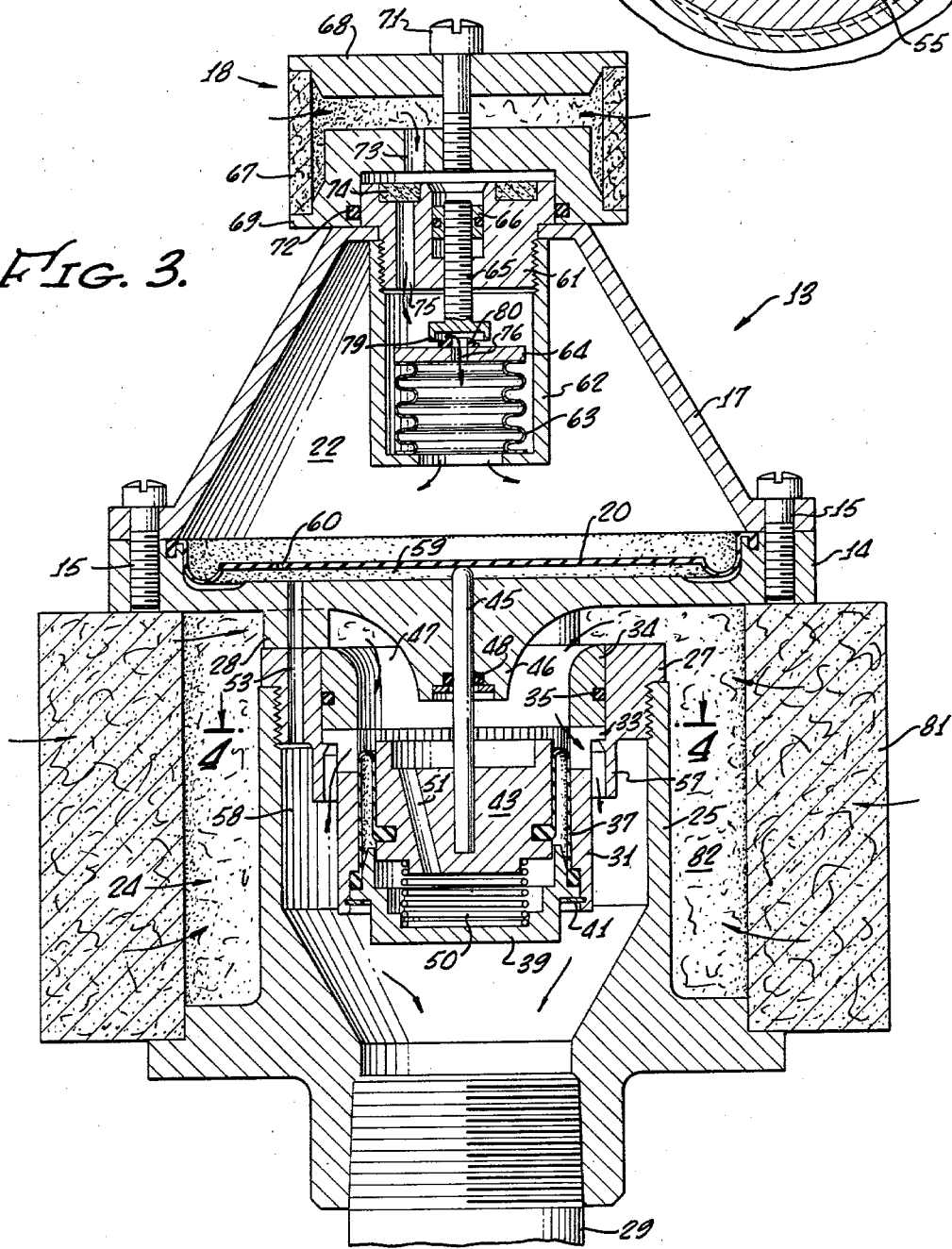
FIG. 3 is a view corresponding to FIG. 2 but showing the main air valve in an open condition permitting introduction of ambient air into the line.

There is seated over tube 31, and held down by lug portions 28 of body 14, an air-flow and mounting ring 34. The upper-inner edge of ring 34 is curved and beveled as shown in FIGS. 2 and 3, and the outer surface thereof is sealed by an O-ring at 35.

A molded rubber sealing sleeve 37, which is somewhat tapered, is provided and has annular beads formed at each end thereof. One bead seats at a shoulder at the lower end of seal tube 31, being held against such shoulder by a cap 39 and snap ring 41. From the lower bead, the sleeve 37 extends upwardly along the interior cylindrical surface of seal tube 31, and then reverse-bends inwardly and downwardly along the exterior cylindrical surface of a seal guide 43 which is preferably a solid element. The remaining annular bead seats in an annular groove in the lower portion of the guide.

A stem 45 is mounted coaxially of guide 43 and extends upwardly through the bottom of body 14. Stated more specifically, the stem extends through a thickened or boss portion 46 of body 14. The boss is curved to define an annular air passage 47. Thus, the curved surfaces of boss 46 and ring 34 define therebetween the aerodynamically efficient annular flow passage 47 for air.

The lower end of boss 46 serves as a stop for seal guide 43, at a region radially-inwardly of a rim of such seal guide. To seal the stem 45, an O-ring 48 is provided and held in position by a ring.

The length of stem 45 is such that when sealing sleeve 37 extends upwardly above notches 33, as shown in FIG. 2, diaphragm 20 is at an elevated position. At this time, the seal guide 43 is seated on boss 46. When, on the other hand, seal guide 43 is at a lower position spaced away from boss 46, as shown in FIG. 3, then diaphragm 20 is at a low elevation and the upper, reverse-bending edge of sealing sleeve 37 is rolled below at least the upper regions of notches 33.

A helical compression spring 50, having a low spring rate, is seated between the lower end of seal guide 43 and the bottom wall of cap 39. To prevent compression effects in the chamber below seal guide 43, as such guide moves upwardly and downwardly, a vent passage 51 is formed through guide 43 from the lower-central region thereof to the upper surface thereof at a location inwardly of its upwardly-extending rim.

Three pressure-sensing passages 53–55 are provided at equally spaced regions about the pressure regulator, as shown in FIGS. 2 and 4. Such passages extend respectively through the feet 28 of body 14 and communicate coaxially with passage extensions through ring 27.

The lower ends of these passages are shielded from the air-flow notches 33 by an annular skirt 57 which extends downwardly from ring 27. Surprisingly, this skirt need not be long yet the pressure present at annular region 58 (below the ends of sensing passages 53) is representative of the pressure in line 11. This despite the fact that substantial quantities of air pass intermittently through the notches 33 and downwardly along the interior of skirt 57.

The sensing passages, 55 communicate with a chamber 59 defined between diaphragm 20 and the upper wall of body 14. A small port 60 in diaphragm 20 effects communication between chamber 59 and dome chamber 22. As an example, for a diaphragm 20 having a diameter of four inches, the diameter of port 60 may be about 1/16 inch.

To control the pressure in dome chamber 22, there is employed the air-inlet and pressure-controlling valve or regulator 18. This comprises means to maintain substantially constant the air pressure in chamber 22. The constant chamber pressure is maintained at a predetermined constant pressure differential below that of the ambient atmosphere. Valve 18 comprises a body 61 which is extended downwardly through an opening in dome 17, and is externally threaded at the lower portion thereof to receive an internally threaded conduit 62. At the lower end of conduit 62 is mounted a bellows-supporting ring to which is sealed the lower end of a bellows 63 having a horizontal plate 64 at its upper end. Bellows 63 is open at the bottom. It acts further as a spring to bias plate 64 upwardly.

The extent of upward movement of bellows plate 64 is determined by an adjustable screw 65 which is threaded upwardly coaxially of body 61. The upper end of screw 65 is disposed in a ring 66 which is seated in a recess in body 61, there being an O-ring to provide friction. The upper end of screw 65 is hollowed out and hexagonally shaped to receive an adjustment wrench, so that the screw 65 may be threaded upwardly and downwardly for adjustment of the pressure in dome chamber 22.

There is provided a filter cap comprising a fine filter 67 seated between upper and lower retaining elements 68 and 69, respectively. A screw 71 extends between elements 68, 69 and holds the filter 67 in position. Sealing, and also frictional mounting of the cap on body 61, are effected by means of an O-ring 72.

The air-flow path into chamber 22 is as follows: Through the fine filter 67, thence through a passage 73 in retainer 69, thence through a coarse filter 74 disposed at an annular groove at the upper end of body 61, and thence through a passage 75 into the region of conduit 62 above bellows 63. When the bellows is in a compressed, open condition, shown in FIG. 3, air can flow through a central opening 76 in plate 64.

To provide an effective seal at plate 64 around opening 76, a radial flange is formed at the lower end of screw 65. Such flange has a depending peripheral skirt 79, and there are air passages cut into such flange to prevent it from blocking air flow. A soft ring 80 is disposed around opening 76 below the screw end, being formed of elastomeric material. Such ring 80 is bonded to the upper surface of a bellows plate 64. The upper-central portion of the soft ring is caused to be upwardly protuberant in order to form a seat for the lower surface of the screw.

The vertical dimension of skirt 79 is caused to be slightly less than the vertical dimension of the soft ring 80. Therefore, the seat is engaged by the screw and prior to the time the lower edge of the skirt is engaged by plate 64. Skirt 79 supports the compressive force of the bellows, without permitting undue compression of ring 80.

Spring 50 is a relatively light spring. The relatively large-area diaphragm 20 and the spring substantially counterbalance each other when there is only a small pressure drop across the diaphragm.

OPERATION

When vacuum pump 12 (FIG. 1) is turned on, there is created in line 11 a pressure sufficiently low (vacuum sufficiently high) to suck diaphragm 20 down. This is because the pressure in chamber 59 is reduced due to outflow of air through passages 53, 55 and pipe 29 into the line.

When the diaphragm 20 moves downwardly, stem 45 also moves downwardly and lowers seal guide 43, for example to the position of FIG. 3. The reverse-bent upper end of sleeve 37 is thus rolled away from the upper regions of air-flow notches 33. This opens an air-flow path through a filter 81 (which is compressed between body 14 and a flange on body 25) into an annular air chamber 82. The air then flows, as shown by the arrows in FIG. 3, through annular flow passages 47 and thence through notches 33 to the portion of the valve inwardly of skirt 57. Thereafter, the air flows downwardly through body 25 and pipe 29 into line 11.

The low pressure in the system also results in drawing-in of air from dome chamber 22 through port 60 in the diaphragm. Therefore, and because the downward diaphragm movement enlarges dome chamber 22, the pressure in chamber 22 decreases until the bias of bellows 63 is overcome to result in downward movement of plate 64. Air then flows (as shown at the upper part of FIG. 3) through opening 76 into the bellows and thus into the dome chamber 22. Such air flow is via the above-traced air-flow path. The air flow into chamber 22 is substantially continuous and is modulated by the bellows to maintain a constant pressure in dome 22. There is a "floating" operation of the plate 64 relative to the seat, whereby sufficient air is admitted into chamber 22 that the pressure therein remains substantially constant at a desired pressure, below atmospheric, determined by the adjusted position of screw 65.

The ambient air entering through the rolling-sleeve air valve 24 increases the pressure in line 11. The increased pressure is "sensed" at passages 53,55 and increases the pressure in the chamber 59 below the diaphragm. Such increased pressure cooperates with spring 50 to raise diaphragm 20 and the seal guide 43. Thus, the reverse-bent upper portion of seal sleeve 37 rolls over notches 33 to close the air flow path shown at the lower portion of FIG. 3. The cycle then repeats.

Because the pressure in dome chamber 22 is substantially constant, there is a substantially constant pressure in line 11 despite various factors such as drawing in of air through one or more sets of teat cups, variation in the operation of pump 12, and so forth.

The reason that line pressure remains substantially constant when the pressure in dome chamber 22 is substantially constant is that there is a substantially continuous, constant pressure drop across diaphragm 20. (The line pressure is always below the sub-atmospheric pressure in chamber 22.) Therefore, the pressure exerted by the diaphragm on stem 45 and the seal guide 43 remains constant and balances the upward pressure exerted by spring 50. This balanced relationship results in the inflow of the proper amount of air through notches 33 to cause the line pressure in line 11 to remain substantially constant.

It is emphasized that when the valve is in the closed position of FIG. 2, there is no leakage through notches 43. The rubber of the sealing sleeve 37 is drawn by the vacuum against the interior cylindrical surface of element 31, fully sealing the notches to prevent air flow therethrough. However, when there is a downward movement of stem 45 caused by a decreased pressure in chamber 59, the sleeve 37 readily rolls away from the notches 33 to permit flow of air therethrough. This action, as distinguished from a shearing action, is not diminished or prevented due to the presence of grit, sticky substances, etc., at the notches.

There being no leakage when the valve is in the closed position of FIG. 2, except the slight air flow through the small-diameter port 60, it follows that the capacity of the vacuum pump 12 need not be high in order to provide proper operation of the system.

The final result, therefore, is a milking-machine system having a closely-regulated vacuum with minimal wastage of air and energy, and by means of a low-cost regulator 13 which may be constructed in whole or in part of synthetic resin. Changes in the diameters of elements 31 and 43, such as result from molding, are not important to operation of the rolling-sleeve valve.

The relatively long stroke (in comparison to my prior construction shown in the cited patents) necessary to open and close the rolling-sleeve valve has been found to provide little if any diminution of the effectiveness of the system in regulating vacuum. Because of the relatively long stroke, there is a much greater operation of bellows 63 than in my prior construction.

The sensing of line pressure in the region 58 (radially-outwardly of skirt 57) has been found to be very accurate despite air flow through notches 33 when the valve is in the position of FIG. 3. This is a surprising result, especially in view of the close proximity of the lower ends of passages 53,55 with the lower end of skirt 57. Present regulator may also be die cast of metal, which has the severe toleranc problems of resins but lessor costs.

The foregoing detailed description is to be clearly understood as given by way of illustration and example only, the spirit and scope of this invention being limited solely by the appended claims.

I claim:

1. A pressure regulator for Tee connection in the line which extends between the vacuum pump and the milking machine of a milking machine system, said pressure regulator comprising:
    (a) a conduit adapted to be connected in said line in Tee relationship,
    (b) air valve means one side of which communicates with the ambient atmosphere and the other side of which communicates with said conduit, whereby said air valve means admits, when in open condition, atmospheric air into said conduit,
       said air valve means being a rolling-sleeve valve,
    (c) spring means connected to said air valve means to urge the same toward closed position preventing admission of atmospheric air into said conduit,
    (d) a diaphragm, and means to associate said diaphragm with said air valve means in such manner that movement of said diaphragm toward said air valve means opens the latter;
    (e) wall means provided on the side of said diaphragm remote from said conduit,
       said wall means defining a dome chamber,
    (f) means to admit atmospheric air into said dome chamber and to maintain the pressure in said dome chamber at a predetermined substantially constant level below that of the ambient atmosphere,
    (g) means to effect communication between said line and the side of said diaphragm adjacent said conduit, and
    (h) means to maintain the air pressure on said adjacent side of said diaphragm at a predetermined substantially constant pressure differential below that in said dome chamber,
       whereby there is no leakage in said valve through said air valve means yet the pressure in said line is caused to be substantially constant at a level which is related to the pressure in said dome chamber.

2. The invention as claimed in claim 1, in which means are provided to communicate the pressure of said line to said adjacent side of said diaphragm, said means including port means located adjacent said rolling-sleeve valve, and in which means are provided between said port means and said rolling-sleeve valve to prevent the air flowing through said rolling-sleeve valve from disturbing the sensing operation at said port means.

3. The invention as claimed in claim 1, in which said pressure regulator is combined with a milking machine system, and said conduit is connected to the line of said system in Tee relationship.

4. The invention as claimed in claim 1, in which said spring means is a relatively lightweight spring having a low spring rate, in which said diaphragm is a large-area diaphragm, and in which said diaphragm and said spring substantially counterbalance each other when there is only a relatively small pressure drop across said diaphragm.

5. The invention as claimed in claim 1, in which said means recited in clause (f) comprises a flexible resilient element one side of which is exposed to atmospheric pressure and the other side of which is exposed to the pressure in said dome chamber, a portion of said element having an opening therein to admit atmospheric air into said dome chamber, in which an adjustable element is mounted opposite said opening, and in which a soft annular seat is provided coaxially of said opening and interposed between said adjustable element and said portion, said seat preventing air flow through said opening when said portion is near said adjustable element, said seat permitting air flow through said opening when said portion is relatively remote from said adjustable element.

6. The invention as claimed in claim 5, and which said flexible resilient element is a bellows.

7. The invention as claimed in claim 5, in which stop means are provided to determine the maximum degree of compression of said soft seat.

8. The invention as claimed in claim 1, in which said means (h) effects bleeding of air from said dome chamber to said adjacent side of said diaphragm.

9. A low-cost highly-accurate pressure regulator, which comprises:
(a) a diaphragm,
(b) means to define a dome chamber above said diaphragm,
(c) means to admit atmospheric air into said dome chamber and to maintain the air pressure in said dome chamber at a predetermined constant value substantially below atmospheric pressure,
(d) means to bleed air through said diaphragm from said dome chamber,
(e) a body disposed on the underside of said diaphragm and cooperating therewith to define a chamber which communicates with said bleed means,
(f) means to effect communication between said chamber and an element the pressure in which is to be regulated,
(g) a stem extending slidably through said body for cooperation with said diaphragm,
(h) a seal guide mounted on said stem,
(i) a seal tube mounted around said seal guide radially-outwardly thereof in spaced relationship therefrom,
said seal tube having port means therein,
(j) a rolling-sleeve seal cooperatively mounted on said seal guide and seal tube,
one end of said sealing sleeve being associated with said seal guide, the other end of said sealing sleeve being associated with said seal tube,
the portion of said sleeve between said ends being reverse-bent and being disposed to cover or uncover said port means in accordance with the axial position of said seal guide,
(k) bias means to urge said guide toward said diaphragm, and
(l) means to admit air to the region of said reverse-bent portion of said seal tube whereby said air may flow through said port means when said seal guide is in a position relatively remote from said diaphragm.

10. The invention as claimed in claim 9, in which said port means comprises a series of notches provided in said seal tube and spaced circumferentially therearound.

11. The invention as claimed in claim 9, in which said means for effecting communication between said chamber and said element, the pressure in which is to be regulated, comprises passage means communicating at one end with said chamber on the underside of said diaphragm and at the opposite end with the region adjacent said port means which are intermittently closed by said seal sleeve, and in which means are provided to shield said opposite end of said passage means from said port means.

* * * * *